United States Patent [19]

Benedict et al.

[11] Patent Number: 4,956,562
[45] Date of Patent: Sep. 11, 1990

[54] HEADLIGHT, WINDSHIELD WIPER CONTROL SYSTEM

[75] Inventors: Charles E. Benedict, Tallahassee; Donald M. Stumpf, Panama City, both of Fla.

[73] Assignee: Benedict Engineering Co. Inc., Tallahassee, Fla.

[21] Appl. No.: 409,612

[22] Filed: Sep. 15, 1989

Related U.S. Application Data

[63] Continuation of Ser. No. 329,304, Mar. 27, 1989, abandoned.

[51] Int. Cl.$^5$ ............................................. H02G 3/00
[52] U.S. Cl. ................................. 307/10.8; 307/10.1; 315/82; 315/83; 340/641
[58] Field of Search .................. 307/9.1–10.8; 315/82, 83; 340/641; 318/444–447

[56] References Cited

U.S. PATENT DOCUMENTS

| | | | |
|---|---|---|---|
| 3,500,119 | 1/1967 | Price | 315/82 X |
| 3,500,120 | 9/1968 | Schultz | 315/82 X |
| 3,519,837 | 12/1968 | Nolin et al. | 315/82 X |
| 3,591,845 | 7/1971 | Vanderpool, Jr. | 315/82 X |
| 3,600,596 | 8/1971 | Alolsantoni | 315/82 X |
| 3,824,405 | 7/1974 | Glaze | 315/82 X |
| 3,909,619 | 9/1975 | Kniesly et al. | 315/83 X |
| 4,057,742 | 11/1977 | Binegar | 315/82 X |
| 4,097,839 | 6/1978 | Lesiak | 315/82 X |
| 4,236,099 | 11/1980 | Rosenblum | 315/83 |
| 4,301,390 | 11/1981 | Earle | 315/82 |
| 4,337,400 | 6/1982 | Hahn | 315/82 |
| 4,656,363 | 4/1987 | Carter et al. | 315/82 |
| 4,667,129 | 5/1987 | Papillon | 315/82 |

Primary Examiner—William M. Shoop, Jr.
Assistant Examiner—Paul Ip
Attorney, Agent, or Firm—Dowell & Dowell

[57] ABSTRACT

A control system for turning on the headlights (and parking lights) of an automobile when the windshield wipers are turned on, has a gating circuit that operates relay circuits to the headlights, the gating circuit electronically latching "in" the headlight relay circuit so that the headlights remain on when the windshield wiper is turned off in order to avoid inadvertent turning off of the hedlights at night time and the gate circuit electronically turning off the headlight (and parking light) relay circuits whenever the headlight switch is turned on or whenever the ignition is turned off, thus assuring that the headlights will remain on until the headlights and ignition switches are turned off. The relay circuits controlled by the gating circuit may operate a mechanically or electrically latched relay device to hold the headlights (and parking lights) on until the relay circuit controlled by the gating circuit operates the mechanically or electrically latched relay device to turn the headlights off. Ambient light and moisture sensors may be used to effect the turning on of the windshield wiper switch.

23 Claims, 4 Drawing Sheets

HEADLIGHT, WINDSHIELD WIPER CONTROL SYSTEM

CROSS-REFERENCE TO RELATED APPLICATION

This application is a continuation of application Ser. No. 07/329,304 filed Mar. 27, 1989, (now abandoned) by Charlos E. Benedict.

BACKGROUND OF THE INVENTION

1. Field of the Invention

The invention relates to an electronic system for controlling the turning on and off of the headlights in conjunction with the operation of the windshield wipers, headlight and ignition switches.

2. History of the Related Art

The turning on of the headlights of a vehicle during poor visibility conditions is recognized as a safety measure. In some states, the law requires that when the windshield wipers are turned on as during rain conditions, the headlights must also be turned on. Systems for automatically turning on the headlights when the windshield wipers are turned on have been known in the prior art. For example, in the U.S. Pat. No. 4,656,363 to Carter, et al. 4,656,363, a transistor circuit is employed to turn the vehicle headlights on and off when the windshield wipers are turned on and off. Similarly, the U.S. Pat. No. 4,236,099 to Rosenblum 4,236,099 discloses a transistor circuit for accomplishing the same purpose. In each case, the operation of the circuit is dependent upon the proper operation of a power transistor.

Earlier U.S. Pat. Nos. which disclose similar or related systems are Price U.S. Pat. No. 3,500,119, Schultz U.S. Pat. No. 3,500,120, Nolin, et al. U.S. Pat. No. 3,519,837, Vanderpoel, et al. U.S. Pat. No. 3,591,845, Aloysantoni U.S. Pat. No. 3,600,596, Glaze U.S. Pat. No. 3,824,405, Binegar U.S. Pat. No. 4,057,742, and Lesiac U.S. Pat. No. 4,097,839.

Summary of the Invention

The present invention involves a digital logic gating circuit whose inputs are low voltage leads associated with the vehicle's ignition switch, windshield wiper switch and headlight switch. The leads are connected to a digital logic gating circuit, the first portion of which has a pair of outputs which connect to the second portion thereof, the second portion forming a latching circuit. In a preferred embodiment, the latching circuit has a pair of outputs, one of which activates a relay to turn the headlights on and the other which activates the relay to turn the headlights off. In a modification, the latching circuit has only one output which is connected to a relay to turn the headlights on, the switch being returned to its off position when the relay is off.

In order to reduce the possibility of failure of operation, the logic circuit preferably has a plurality of parallel identical circuits which activate the relay circuit that operates the headlights. Due to the redundancy of the circuits and the arrangement of the components, the possibility of a system failure is significantly less than otherwise would be expected. However, the logic circuit may consist of only one circuit.

In the operation of the system, when the manual ignition and windshield wiper switches are turned on, the output from the latching circuit portion of the logic system activates the relay circuit to cause the headlights to turn on. However, if the windshield wiper manual switch is then turned to the off position, the output remains the same so that the headlights remain on. In order to turn the headlights off by mean of the relay system while the windshield wipers are off, it is necessary first to momentarily turn the manual headlight switch on or turn the ignition switch off. This causes the output from the latching circuit to change and activate a different relay circuit which turns the headlights off. The modification has a similar input and logic circuitry but has only one output which activates the relay to turn the headlights on. In the modification, the activation is simply removed which permits the relay through mechanical means to return to its former condition in which the headlights are off. In addition, the digital logic circuit components are protected from voltage surges and transient voltages which can destroy the integrity of these components.

An additional feature is the provision of ambient light and moisture sensors for effectively turning on the windshield wiper switch whenever the ambient light is below a predetermined level or the moisture is above a predetermined level.

BRIEF DESCRIPTION OF THE DRAWINGS

Other objects and advantages of the invention will become apparent from the following description in conjunction with the accompanying drawings in which.

DESCRIPTION OF THE PREFERRED EMBODIMENT

Figures 1, 2:
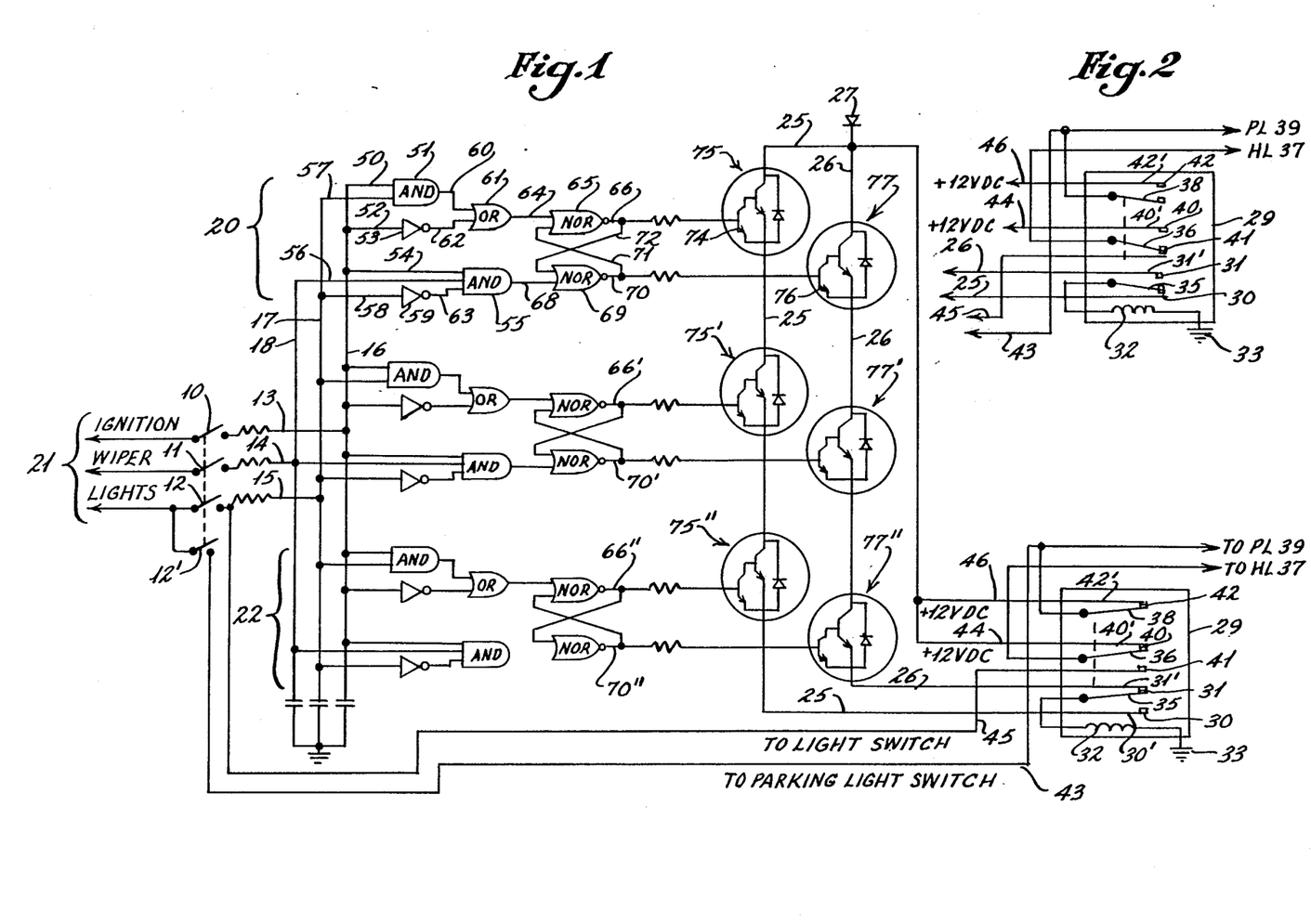
FIG. 1 is a schematic of a preferred embodiment of the invention.
FIG. 2 is a schematic of the mechanical latching section in the opposite mode from that of FIG. 1.

With further reference to the drawings, the circuit of the present invention, as illustrated in FIG. 1, includes low voltage inputs which are connected by the manual operation of the ignition, windshield wiper and headlight switches, 10, 11 and 12, and parking light switch 12', respectively. The inputs are connected through suitable protective resistances to leads 13, 14 and 15, respectively, to trunk lines 16, 17 and 18 which feed three parallel identical gating circuits 20, 21 and 22. The gating circuits are connected at their outputs to relay circuit lines 25 and 26 connected to the low voltage power supply 27 and at their other ends to contacts 30 and 31 engageable by arm or blade 35, movable by a solenoid or the like which is actuated by relay coil 32 which is connected to the ground 33. The core of the solenoid drives a stepping relay switch 29 of conventional construction which separates the contacts that the current is flowing through and mechanically latches the inactive contacts together. Contacts 30 and 31 are mounted stationary on arms 30', 31' and alternately engage movable blade 35 which is connected to coil 32. The relay switch also has a blade 36 connected to the headlights 37 and a blade 38 connected to the parking lights 39 and to the parking light switch 12' through line 43.

The headlight blade 36 is engageable alternately with contact 40 on arm 40' connected to line 44 low voltage supply 27 or with contact 41 on arm 41' connected to the headlight switch through line 45. Parking light blade 38 is alternately engageable and disengageable with contact 42 on arm 42' connected to the line 46 to the low voltage supply 27.

The stepping relay switch simultaneously moves the blades 35, 36 and 38 to the positions to engage contacts 31, 40 and 42, as shown in FIG. 1, or alternately moves such blades from their contacts and moves the first two into engagement with contacts 30 and 41, and blade 38 into inactive position.

Turning to the logic circuits, the trunk line 16 for the ignition has a lead 50 providing an input to an AND gate 51, an input 52 to an inverter 53, and an input 54, to an AND gate 55. The windshield wiper trunk line 18 has a lead 56 providing an input to the AND gate 55.

The trunk line 17 for the headlights has a lead 57 providing an input to the AND gate 51, and a lead 58 providing an input to an inverter 59 which has an output 63 connected to an input to AND gate 55.

The AND gate 51 has an output 60 which provides an input to an OR gate 61. Similarly, the inverter 53 has an output 62 which provides an input to the OR gate 61. The OR gate 61 has an output 64 which provides an input to a NOR gate 65 having an ouput 66. The AND gate 55 has an ouput 68 providing an input to a NOR gate 69 having an output 70. The output 70 of the NOR gate 69 is also connected to a line 71 providing an input to the NOR gate 65. Similarly, the output 66 of the NOR gate 65 has a line 72 providing an input to the NOR gate 69.

The ouput 66 from the NOR gate 65 is connected through a suitable protective resistor to the activating portion 74 of a transistor 75 in the relay line 25. The output 70 from the NOR gate 69 is connected through a suitable protective resistor to the activating portion 76 of transistor 77 in the relay line 26.

The outputs from the gating systems 20, 21 and 22 are connected to the activating portions of transistors which are in series in each of the relay lines 25 and 26. Thus, the outputs 66, 66′, 66″ are connected to the transistors 75, 75′, 75″ which are in series in the relay line 25 and the outputs 70, 70′, 70″ are connected to the transistors 77, 77′, 77″ which are in series in the relay line 26.

The AND gates 51 and 55 are each of the type in which all of the inputs must be high in order for the output to be high. The OR gate 61 is of the type in which if one or the other of its inputs is high, then the output will be high. The NOR gates 65 and 69 are the type which have a high output only if both inputs are low. Otherwise, the output is low.

In the operation of the device, assume that the manual ignition switch 10 and windshield wiper switch 11 are turned on but that the headlight manual switch 12 is off. In this situation, the inputs on lines 50, 52 and 54 are high, the input on line 56 is high, and the inputs on lines 57 and 58 are low. This results in low outputs on the lines 60 and 62 from the gate 51 and inverter 53, respectively, feeding into the gate 61. At the same time, the low input on the line 58 to the inverter 59 produces a high output in line 63 matching the outputs in the lines 54 and 56 to the gate 55 therefrore producing a high output in the line 68 therefrom. Thus, the input to the NOR gate 65 from the line 64 is low and the input to the NOR gate 69 from the line 68 is high. This causes the output in line 70 from the gate 69 to be low and to provide a second low input to the gate 65 thereby providing a high output therefrom.

The high output in line 66 therefore passes to the activating portion 74 of the transistor 75 thereby permitting conduction of the relay line 25 to the coil 32 of the latch relay 29, as illustrated in FIG. 2, in order to move the solenoid into position for turning on the headlights and the parking lights of the vehicle, as shown in FIG. 1. The circuit through arm 30′, contact 30 and blade 35 to coil 32 causes the solenoid to move the contacts to the position of FIG. 1 connecting the headlights and parking lights to the 12 volt supply 44 and 46.

Assuming that the driver turns the windshield wiper switch 11 to the off position, the latching circuit formed by the gates 65 and 69 and associated wiring will continue to maintain the relay line 25 energized to keep the headlights on, as follows.

The inputs 50, 52 and 54 remain high as previously. Similarly, the inputs 57 and 58 remain low as previously. However, the input 56 is now low instead of high as previously. Since the inputs to the AND gate 51 and the inverter 53 remain the same, the output from the OR gate 61 remains the same or low supplying the NOR gate 65. However, since the input 56 to the AND gate 55 is low, its output in line 68 is now low to the gate 69 of the latching gate system.

Since the NOR gate 65 was already producing a high output in line 66 which is fed as an input to the NOR gate 69, the NOR gate 69 is incapable of changing to a high output. Thus, this low output continues to be fed to the other input of the NOR gate 65 producing a high output in the line 66 to the transistor 75. Thus, the NOR gates 65 and 69 are locked together to provide a high output in line 66 even though each receives the same low input.

In order to activate the other relay line 26 to cause the latching relay circuit to the solenoid to turn the relay circuit to the headlights off, it is necessary momentarily to turn the manual headlight switch 12 to the on position, with the windshield wiper switch 11 in the off position and the ignition switch on. With this combination, the inputs from the ignition 50, 52 and 54 remain unchanged as high. Similarly, the input 56 is low as before. However, the inputs 57 and 58 to the gate 51 and the inverter 59 are high. This results in the output from the gate 51 being high and the output from the inverter 59 being low. At the same time, the output from the inverter 53 is also low. This results in the output from the gate 61 being high and the output from the gate 55 being low. In view of a high output by line 64 going into gate 65, its output in line 66 becomes low which feeds another low into the gate 69 thereby producing a high output at 70 which activates the transistor 77 in the line 26 of the relay to cause the switch 29 to step to the position of FIG. 2 in which the headlights and parking lights are disconnected from the supply 27.

When switch 29 is in the position of FIG. 2, the operator may turn the lights off or on by operation of the switches 12 and 12′.

Figure 3:
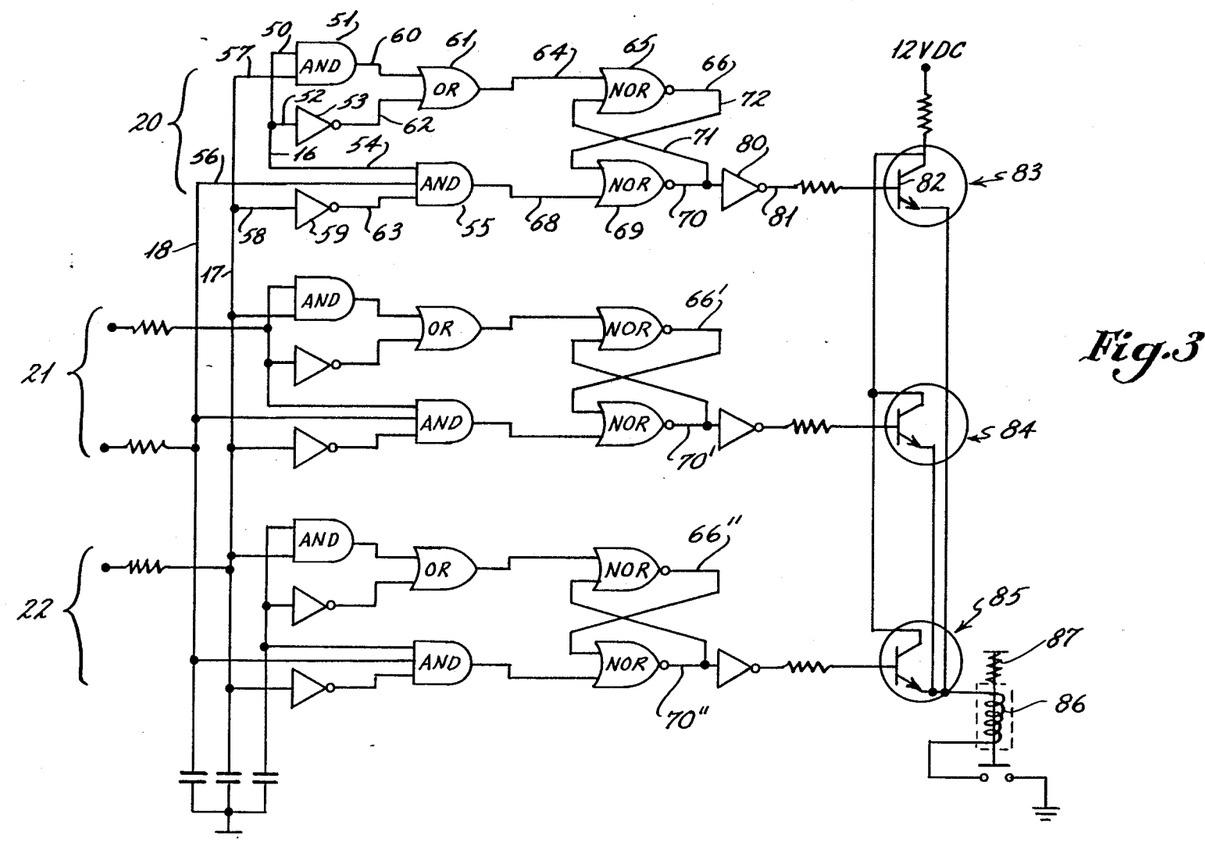
FIG. 3 is a schematic of a modification.

The modification of FIG. 3 has the same arrangements of switches and parallel gate circuits as in FIG. 1 and therefore does not need to be separately described. (Details of the switches 10, 11 and 12 have been omitted for simplicity.) However, the only output from the gate circuit is the line 70 which feeds to inverter 80 to line 81 to the activating portion 82 of the transistor 83.

In the arrangement of FIG. 3, the transistors 83, 84 and 85 are in parallel with the relay coil 86. In FIG. 3, the relay coil 86 operates a solenoid with a spring 87 or other kind of mechanical return so when the relay 86 of the coil is not energized, the solenoid is automatically returned to its former position.

It will be apparent therefore that when the ignition and windshield wipers are turned on with the headlight switch turned off and when the windshield wiper switch is later turned off that in each situation, the transistors will be activated to power the relay to turn the headlights on. However, in the position in which the ignition is on the windshield wipers off and the headlight switch is turned on, then the relay will not be electrically energized but is then returned to its former position to turn the headlights off.

In FIG. 1, due to the activation to the three transistors in series, the possibility of total failure which would result in turning off the lights by activating the relay 26 is greatly reduced.

Furthermore, due to the electronic latching circuit provided by the gates 65 and 69 and their associated wiring, the possibility of a circuit malfunction which would permit the headlights to turn off is greatly reduced.

Furthermore, in the embodiment of FIG. 1 in which the mechanical latching relay is employed, if there is a failure in any one of the gates or inverters 51, 53, 55 or 61 which results in sending a false pulse to the gates 65 and 69, it will not change the output of the relay because the inputs to the gates 65 and 69 both have to change states for their outputs to change state. Further, when the relay circuit line 25 with the transistors in series is turned on, it results in a mechanical latching of the solenoid relay to turn the headlights on. A mere subsequent failure in the relay line 25 would not result in unlatching of the mechanical latch and therefore would not cause the headlights to turn on.

On the other hand, in the embodiment of FIG. 3, if there is a failure in the actuation of the relay 87 after the headlights are turned on, it could result in the headlights being turned off. However, since the three logic circuits are in parallel and activate transistors 83, 84 and 85 in parallel, the activation of any one will serve to maintain the relay in the position in which the headlights are on. Thus, the possibility of a failure is minimized.

It is also significant that the control circuit itself is isolated from the headlight circuit by means of the relay. Thus, no matter what happens in the headlight circuit, there will be no effect on the control circuit itself.

Although the logic means has been described as operating or driving mechanical latching means, either by an alternate or a continuous relay line, the invention contemplates the driving of a latching means governed by other well-known devices such as a thermal or a solid state relay.

Figure 4:
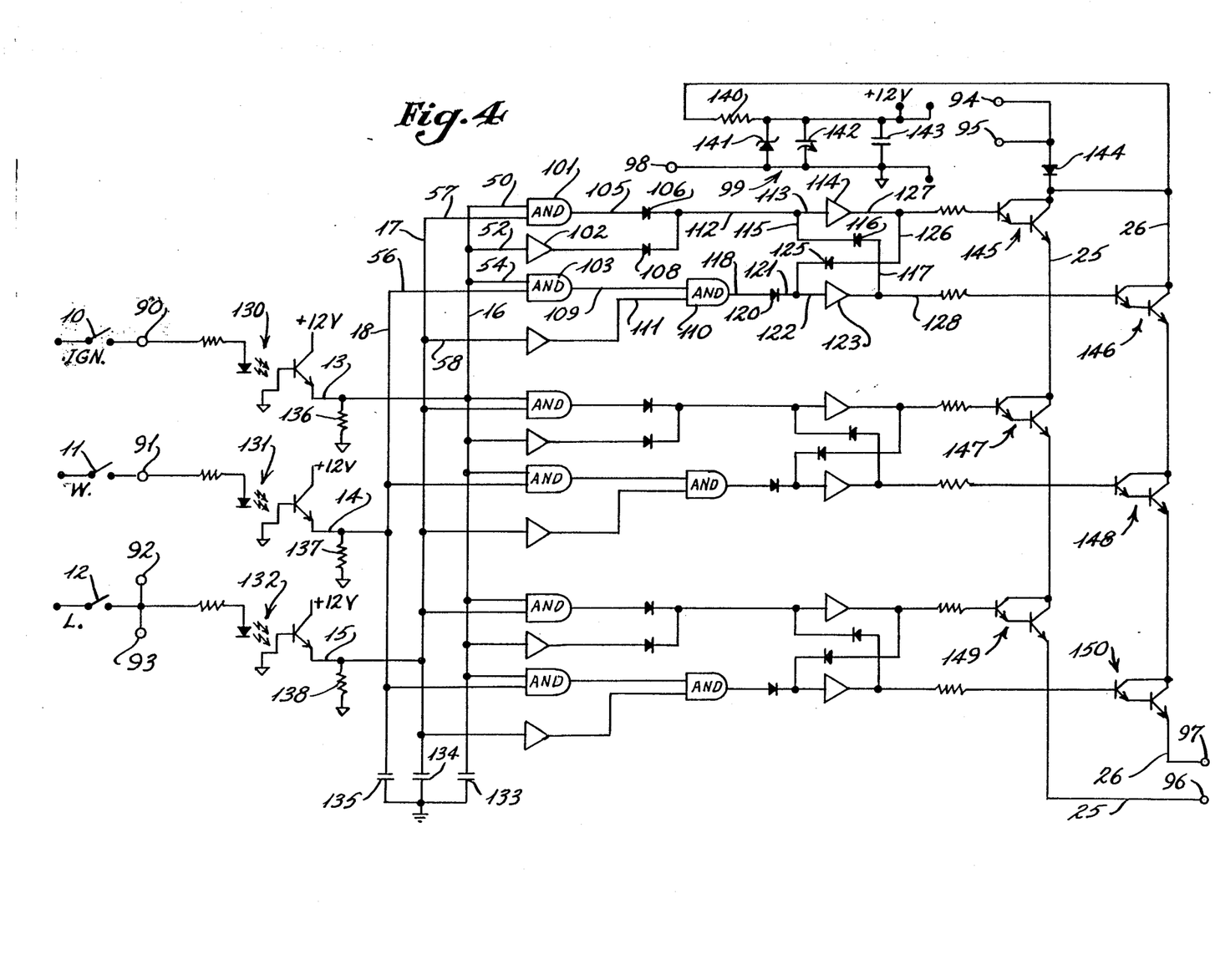
FIG. 4 is a schematic of a further modification.

The modification of FIG. 4 illustrates a logic circuit in which the same result as previously described is accomplished with the substitution of some components. Further, a modular arrangement is illustrated for connection to relay circuitry similar to that previously described.

In FIG. 4, the inputs include posts 90, 91 and 92 from the ignition switch 10, wiper switch 11, and headlight switch 12 through suitable logic circuit transient protective components to the leads 13, 14 and 15 connected to the logic circuits. Post 93 is a common input from the headlight and parking light switches 12 and 12′ to the lines 45 and 43 to the headlights and parking lights through the relay connections as shown in FIG. 1.

Post 94 is an input from the conventional 12 volt DC supply in the vehicle for connection to the leads 44 and 46 to the headlights and parking lights through the relay connections as shown in FIG. 1. Post 94 is also used for the supply to the lines 25 and 26 to the relay coil previously described.

Post 95 is an input from the 12 volt supply for connection to the leads 45 and 43 to the headlights and parking lights as described above.

Post 96 and 97 are the outputs from the leads 25 and 26 to the relay of FIGS. 1 and 2.

Post 98 is a ground connection for the logic circuit through conventional transient limiting circuitry 99.

The circuit of FIG. 4 provides essentially the same result to relay circuit output lines 25 and 26, as in FIG. 1.

On the input side, the trunk line 16 for the ignition has branch lines 50, 52 and 54 as in FIG. 1. Similarly, the headlight switch or trunk line 17 has branch lines 57 and 58 and the windshield wiper trunk line 18 has branch line 56.

The ignition branch line 50 is connected to AND gate 101, line 52 to inverter 102 and line 54 to AND gate 103.

The headlight switch branch line 57 is connected to the AND gate 101, and branch line 58 to inverter 104.

The windshield wiper branch line 56 is connected to the AND gate 103.

The AND gate 101 has an output 105 connected to diode 106. The inverter 102 has an output 107 connected to diode 108 AND gate 103 has an output 109 connected to AND gate 110. Inverter 104 has an output 111 also connected to AND gate 110.

The outputs from the diodes 106 and 108 are connected to a common line 112 which is connected by lead 113 to inverter 114. The line 112 has a branch lead 115 connected to the output side of diode 116 having an input lead 117.

The output 118 from AND gate 110 is connected to the input of diode 120 having an output 121 with one branch 122 connected to inverter 123 and another branch 124 connected to the output side of a diode 125, the input side 126 of which is connected to line 127 on the output of the inverter 114. The output 128 from the inverter 123 is connected to the line 117 providing the input to the diode 116.

Line 127 is connected to the activating portions of power transistors 145, 147 and 149 in output line 25 to the relay and the output line 128 is connected to the activating portions of power transistors 146, 148 and 150 in line 26 to the relay.

In the operation of the device, assume that the manual ignition switch 10 and windshield wiper switch is turned on but the headlight manual switch is off. In this situation, the inputs on lines 50, 52 and 54 are high, the input on line 56 is high and the inputs on lines 57 and 58 are low. This results in low outputs on the lines 105 and 107 from the AND gate 101 and inverter 102, respectively, with a resultantly low input to the inverter 114. At the same time, the lines 109 and 111 from the AND gate 103 and inverter 104 are high, resulting in a high output from the AND gate 110 through the diode 120 which feeds the inverter 123 and resulting in a low output in the line 128. Since the output from the inverter 114 is high, the output in line 127 activates the transistors 145, 147 and 149 in line 25 thereby permitting conduction of the relay line 25 to the coil of the relay.

Assuming that the driver turns the windshield wiper switch to the off position, the latching circuit formed by the inverters 114 and 123 and their associated elements will continue to maintain the same circuit to relay line 25 to keep the headlights on, as will be described. The inputs 50, 52 and 54 remain high as previously. Inputs 56, 57 and 58, however, are now low. This results in low outputs in the lines 105, 107 and 109 from the AND gate 101, the inverter 102, and the AND gate 103, respectively. The output in the line 111 from the inverter 104 remains high as previously, resulting in a low output in line 118 to diode 120 and line 122 to inverter 123. However, the low output in line 112 from the diodes 106 and 108 to the inverter 114 results in a high output in line 127 to relay line 25 and through diode 125 to line 122 to inverter 123. Thus, output 128 from inverter 123 is low. Thus, in this embodiment, even though the output from the AND gate 110 has changed to a low output, the gates 114 and 123 are locked together to provide a high output in line 127.

In order to activate the other relay line 26 to cause the latching relay circuit to the solenoid to turn the relay circuit to the headlights off, it is necessary momentarily to turn the headlight switch 12 to the on position, with the windshield wiper switch 11 in the off position and the ignition switch on. With this combination, the inputs from the ignition 50, 52 and 54 remain unchanged, as high. Similarly, the ignition input 56 remains low. However, the inputs 57 and 58 to the AND gate 101 and the inverter 104, respectively, are high. This results in the output from the AND gate 101 being high, the output from the inverter 102 being low, the output from the AND gate 103 being low, and the output from the inverter 104 being low. This in turn, results in the output in the line 112 being high, since the two diodes 106 and 108 function like an OR gate, and the output 118 from the AND gate 120 being low. The result is that the output from the inverter 123 is high, which is connected to the line 26 to the relay, thus activating it and turning the headlight switch and the relay off.

Figure 5:
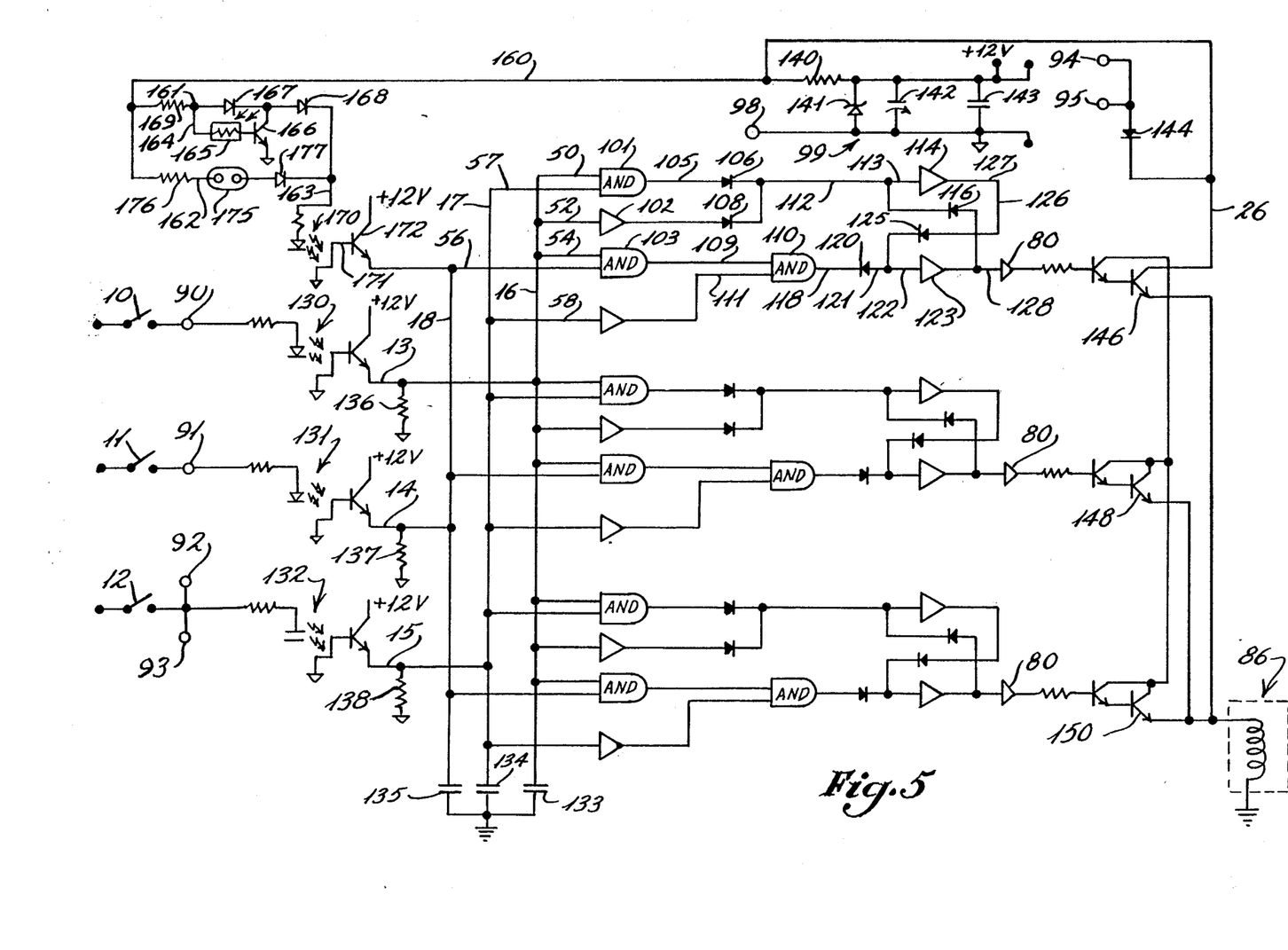
FIG. 5 is a schematic of a further modification.

The protection of the solid state components from transient voltage and high or low voltage is illustrated in FIGS. 4 and 5. Thus, between the inputs 10, 11 and 12, and the leads 13, 14 and 15 light actuated transistors, or OPTO isolators 130, 131 and 132 are inserted which isolate the input voltages from the transistor outputs to the circuits.

RC circuits on each signal input line absorb any voltage spikes coming in on the 12 V DC supply to the light actuated transistors on the signal inputs. The voltage stored in the capacitors 133, 134 and 135 is drained off through thermistors 136, 137 and 138.

The resistor 140, zener diode 141, capacitors 142 and 143, and diode 144 filter transients and large voltage surges from the +12 V DC supply and induction voltages and thus protect power transistors 145–150. And, as mentioned earlier, post 98 connects the logic components capacitors to ground.

The modification of FIG. 5 has inputs and logic circuits like FIG. 4, but has only one output from the gate circuit, as in FIG. 3.

Thus, in FIG. 5, the inputs and branch lines 56–58 are the same as in FIG. 4, as are the gates in those lines. However, output line 127 is merely connected to line 126, there being no transistor 145 and line 25 as in FIG. 4. Further, as in FIG. 3, an inverter 80 is in output line 128 to the activating portion of transistor 146.

The output side from the branch lines 56–58 is, as in FIG. 3, connected to transistors 146, 148 and 150 which are in parallel with relay coil 86, which operates as described in FIG. 3.

FIG. 5 also illustrates a light sensing and moisture sensing circuit which may be used with any of FIGS. 1–5. The purpose of this circuit is to bypass the windshield wiper switch 11 whenever moisture or the absence of light indicate that the headlights should be turned on.

The circuit includes an input line 160 from the 12 volt supply previously described. Line 160 is connected in parallel with line 161 and 162 which are connected to line 163 leading, by way of other components, to trunk line 18 of the windshield wiper. Line 161 has a parallel line 164 in which a light sensor 165 is located, the other end of the light sensor being connected to the base of a transistor 166 and the line 164 being parallel with a diode 167 which ensures that there is 0.7 volts at the base of the transistor 166. Diode 168 prevents positive voltages from feeding back into the light sensing circuit.

When light strikes the sensor 165, its low resistance acts as a short between the 12 volt supply and the base of the transistor 166. Under this condition, the transistor conducts and lowers the voltage at the collector below the turn on voltage of an opto isolator 170 in line 163. When no light strikes the light sensor, the transistor 166 is turned off and the voltage at the collector of the transistor 166 is 12 volts which turns on the opto isolator 170. Resistor 169 is for the purposes of limiting current. From opto isolator 170, line 171 is connected to the base of transistor 172, whose collector is connected to the 12 volt supply and whose emitter is connected to line 173 to line A moisture sensor 175 is provided in the line 162, preceded by a current limiting resistor 176 and followed by a diode 177 which prevents positive voltages from feeding back into the moisture sensing circuit.

When there is no moisture on the sensor, it acts as an open switch and no voltage goes to the opto isolator 170. When there is moisture on the sensor it acts as a short circuit and puts 12 volts at the opto isolator 170.

Accordingly, it will be seen that when either the light is below the level of conduction of the light sensor 165, or if the moisture on the sensor 175 is greater than that required for conducting then a circuit will be completed to the line 18, just as though the windshield wiper switch were turned on. Under these conditions, as seen on the truth table, the mere turning on of the ignition switch and the presence of either adequate moisture or of insufficient light will turn on the headlights.

It will thus be seen that with the present invention, the lights are turned on under any three conditions: first, if the ignition and windshield wiper switches are turned on; second, if there is low ambient light; and third if there is sufficient moisture to activate the sensor.

Accordingly, it will be understood that the control system of the present invention includes a logic system which determines the correct outputs for a given set of inputs, and is substantially fail-safe due to a selection of components and/or a plurality of circuits. In one type of embodiment, the system uses parallel logic circuits with series latching relays including power transistors for a mechanically latching relay, or parallel logic circuits with parallel latching relays (power transistors) for an electrically actuated relay.

A Truth Table for each embodiment is as follows:

Truth TABLE

| Inputs | | | Output | | |
|---|---|---|---|---|---|
| A | B | C | T-1 | T-2 | NC |
| 0 | 0 | 0 | | X | |
| 0 | 0 | 1 | | X | |
| 0 | 1 | 0 | | X | |
| 0 | 1 | 1 | | X | |
| 1 | 0 | 0 | | | X |
| 1 | 0 | 1 | | X | |

Truth TABLE-continued

| Inputs | | | Output | | |
|---|---|---|---|---|---|
| A | B | C | T-1 | T-2 | NC |
| 1 | 1 | 0 | X | | |
| 1 | 1 | 1 | | X | |

A—Ignition Switch
B—Windshield Wiper Switch
C—Headlight Switch
0—off
1—on
T-1 Active state headlights "on" from relay
T-2 Inactive state headlights "off" from relay with control back to headlight switch
NC No change from previous state

We claim:

1. An automatic system for controlling the turning on of vehicle headlights when ignition and windshield wipers are turned on and for keeping them on when the wipers are turned off, comprising on-off switches for the ignition, wipers and headlights, a first relay circuit, a relay switch, said relay switch having means for connecting said headlights to power supply means, said first relay circuit being alternately connectable to actuating means for said relay switch which governs the connection of said headlights to said power supply means, said power supply means connected to said first relay circuit, control means for said first relay circuit, logic circuit means connecting the outputs of said ignition and headlight switches to the control means for said first relay circuit, said logic circuit means connecting the outputs of said ignition, wipers and headlights to form a latching circuit, said latching circuit producing a signal output to activate said control means for said first relay circuit to turn the headlights on when the ignition and wiper switches are turned on, said latching circuit continuing to produce such signal output when the wiper switch is turned off.

2. The invention of claim 1, and a second relay circuit, said first and second relay circuits being alternately connectable to said operating means for said relay switch, control means for said second relay circuit, said logic circuit means connecting the outputs of said ignition, wipers and headlights to the control means for said second relay circuit which is operative to turn the headlights off in response to the turning on of the on-off switch for the headlights, or the turning off of the ignition switch.

3. The invention of claim 2, said first relay circuit operating a mechanical latching means operative to hold the headlights turned on until the second relay circuit is activated.

4. The invention of claim 3, said second relay circuit operating said mechanical latching means to hold the headlights turned off until the first relay circuit is activated or until the headlight switch is turned on.

5. The invention of claim 1, in which a plurality of first logic circuit means are connected in parallel, each first logic circuit means producing a first signal output to said first relay circuit.

6. The invention of claim 2, in which a plurality of second logic circuit means are connected in parallel, each second logic circuit means producing a second signal output to said second relay circuit.

7. The invention of claim 2, in which a plurality of first logic circuit means are connected in parallel, each first logic circuit means producing a first signal output, and in which a plurality of second logic circuit means are connected in parallel, each second logic circuit means producing a second signal output.

8. The invention of claim 5, in which a plurality of first signal outputs are operative in series to activate said first relay circuit.

9. The invention of claim 6, in which a plurality of second signal outputs are operative in series to activate said second relay circuit.

10. The invention of claim 5, in which a plurality of first signal outputs are operative in parallel to activate said first relay circuit.

11. The invention of claim 1 in which said logic circuit means comprises the output of said ignition having three branches connected respectively, to a first AND gate means, a first inverter, and a second AND gate means, the output of said headlights having two branches connected respectively to said first AND gate means and a second inverter, the output of said wipers being connected to said second AND gate means, the output of said first AND gate means being connected to OR gate means, the output of said first inverter connected to said OR gate means, the output of said second inverter connected to said second AND gate means, the output of said OR gate means connected to a first NOR gate means, the output of said second AND gate means connected to a second NOR gate means, the output of each respective NOR gate means connected to the input of the other NOR gate means, the output of the first NOR gate means connected to a control means for said first relay circuit, and a second relay circuit operative to turn the headlights off when the switch for the headlights is turned on or when the ignition is turned off, the output of said second NOR gate means connected to a control means for said second relay circuit.

12. The invention of claim 1 in which said logic circuit means comprises the output of said ignition having three branches connected respectively to a first AND gate means, a first inverter, and a second AND gate means, the output of said headlights having two branches connected respectively to said first AND gate means and a second inverter, the output of said wipers being connected to said second AND gate means, the output of said first AND gate means being connected to OR gate means, the output of said first inverter connected to said OR gate means, the output of said second inverter connected to a third AND gate means, the output of said OR gate means connected to a first NOR gate means, the output of said second AND gate means connected to said third AND gate means, the output of which is connected to a second NOR gate means, the output of said first NOR gate means connected to the input of said second NOR gate means and to the control means for said first relay circuit, and a second relay circuit operative to turn the headlights off when the switch for the headlights is turned on, or when the ignition switch is turned off, the output of said second NOR gate means connected to the input of said first NOR gate means and to the control means for said second relay circuit.

13. The invention of claim 1, and light activated transistor means between the on-off switches and the relay circuits which isolate the input voltages from the transistor outputs.

14. The invention of claim 1, each relay circuit having an input connected to an on-off switch, and RC circuit means in each input to protect the relay circuit from excessive voltages.

15. The invention of claim 14, and thermistor means connecting the inputs to ground.

16. The invention of claim 1, in which said operating means for said relay switch includes a low voltage power supply, and means for filtering transients and high voltage surges from such power supply and passing them to ground.

17. The invention of claim 1, means for sensing the ambient light level, and means for effectively turning on the windshield wiper switch when the ambient light level is below a predetermined level.

18. The invention of claim 17, in which the means for effectively turning on the windshield wiper switch is connected to a bypass around said switch.

19. The invention of claim 1, means for sensing the moisture level, and means for effectively turning on the windshield wiper switch when the moisture level is above a predetermined level.

20. The invention of claim 19, in which the means for effectively turning on the windshield wiper switch is connected to a bypass around said switch.

21. The invention of claim 17 in which the means for sensing the ambient light level is connected to the base of a transistor which conducts and lowers the voltage at the base when the ambient light is below a predetermined level.

22. The invention of claim 21 in which the light sensing means and the transistor are in series with each other and are in parallel with a line between a low voltage power supply and the bypass.

23. The invention of claim 1, means for sensing the ambient light level, means for sensing the moisture level, said means connected in parallel, and means connected to said light sensing and moisture sensing means for effectively turning on the windshield wiper when the ambient light level is below a predetermined level or when the moisture level is above a predetermined level.

* * * * *